United States Patent [19]

Buschbom

[11] Patent Number: 5,035,317
[45] Date of Patent: * Jul. 30, 1991

[54] IMPELLER ASSEMBLY WITH ADJUSTABLE IMPELLER

[75] Inventor: Floyd E. Buschbom, Long Lake, Minn.

[73] Assignee: Van Dale, Inc., Long Lake, Minn.

[*] Notice: The portion of the term of this patent subsequent to Oct. 23, 2007 has been disclaimed.

[21] Appl. No.: 542,538

[22] Filed: Jun. 25, 1990

Related U.S. Application Data

[62] Division of Ser. No. 388,140, Aug. 1, 1989, Pat. No. 4,964,502.

[51] Int. Cl.$^5$ .............................................. B65G 31/04
[52] U.S. Cl. ..................... 198/642; 414/319; 37/251; 37/255; 406/57; 406/97; 406/100
[58] Field of Search ................. 198/640, 642, 723; 414/313, 319, 320; 406/57-59, 71, 97, 100; 37/251, 254-256, 259

[56] References Cited

U.S. PATENT DOCUMENTS

| | | |
|---|---|---|
| 2,712,412 | 7/1955 | West . |
| 3,539,059 | 11/1970 | Buschbom . |
| 3,589,500 | 6/1971 | Hansen . |
| 4,425,058 | 1/1984 | Sorensen et al. . |
| 4,595,318 | 6/1986 | Viesselmann . |
| 4,964,502 | 10/1990 | Buschbom .......................... 198/624 |

Primary Examiner—Joseph E. Valenza
Attorney, Agent, or Firm—Burd, Bartz & Gutenkauf

[57] ABSTRACT

An impeller assembly having a housing supporting a rotatable impeller. The housing has a bottom entrance opening and a top exit opening separated by a curved back wall. A liner of low friction and abrasive resistant plastic material covers the inside of the back wall. The liner is removeably mounted on the housing so that it can be replaced without taking the housing apart. The impeller has a plurality of pivoted paddle assemblies. Each paddle assembly has a generally U-shaped liner of low friction and abrasion resistant material. The impeller is adjustably mounted on the housing to provide a minimum of clearance between the liner and the outer ends of the paddle assemblies as they rotate within the housing.

22 Claims, 5 Drawing Sheets

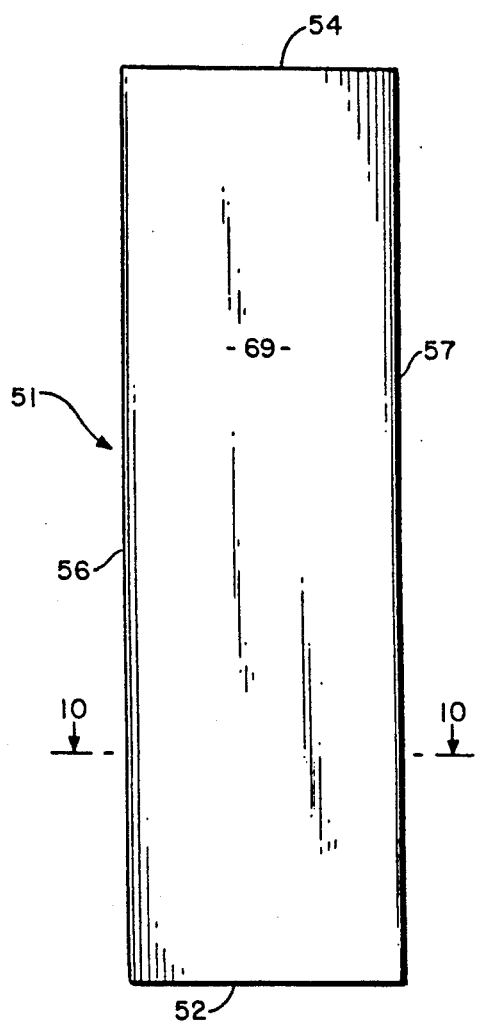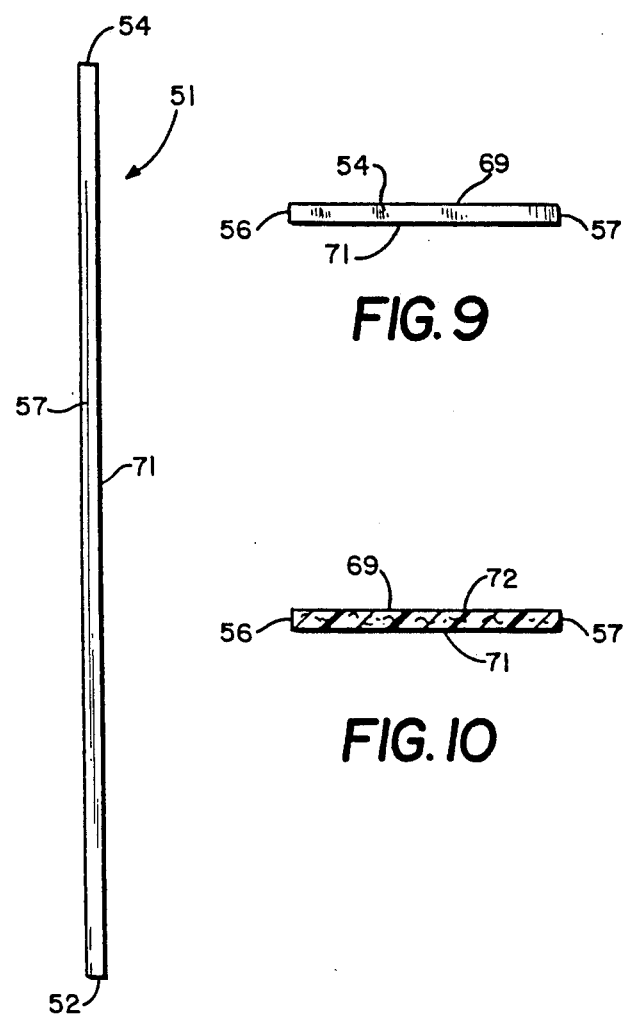
FIG. 7 FIG. 8 FIG. 9 FIG. 10

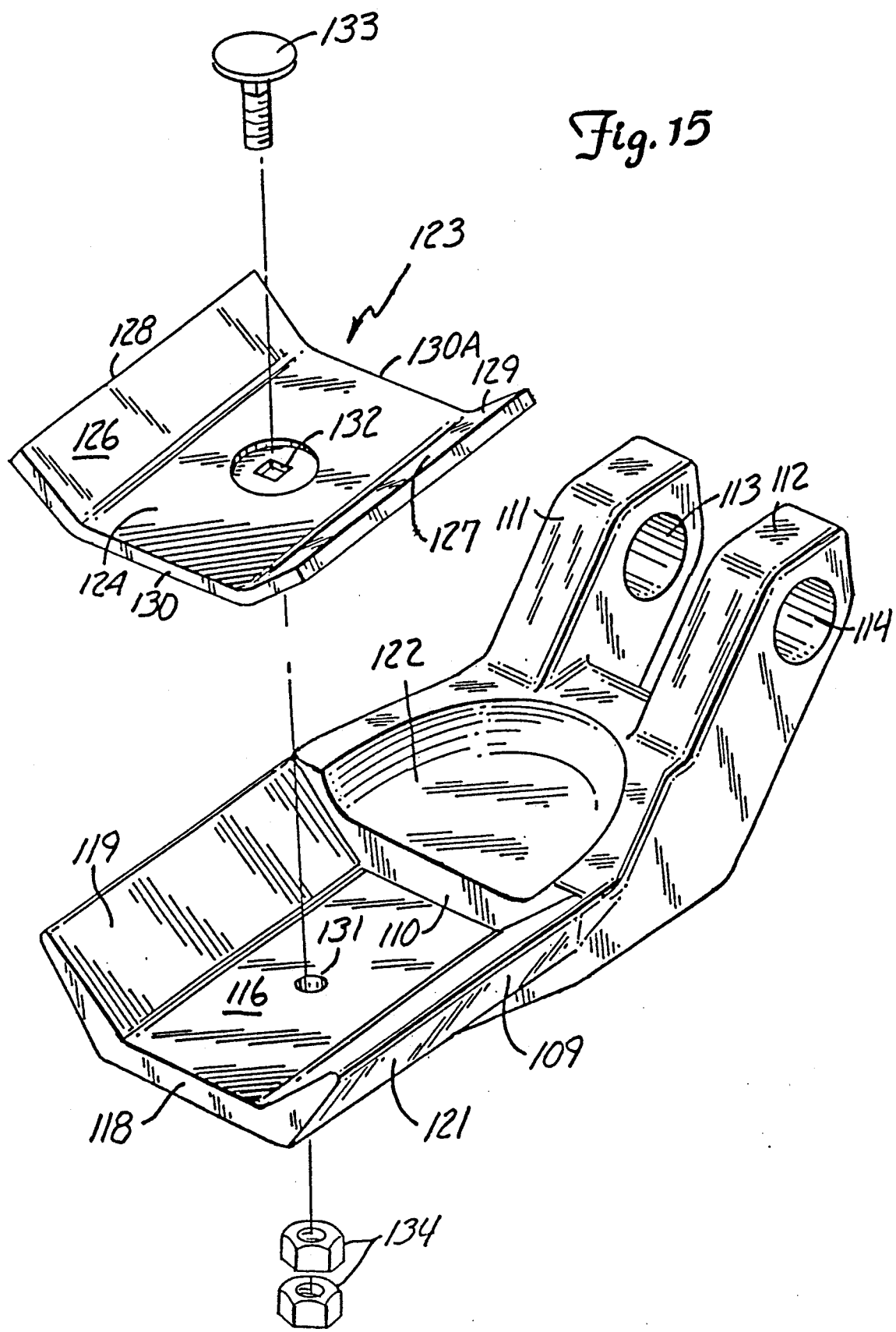

IMPELLER ASSEMBLY WITH ADJUSTABLE IMPELLER

CROSS REFERENCE TO RELATED APPLICATION

This application is a division of U.S. application Ser. No. 388,140 filed Aug. 1, 1989, now U.S. Pat. No. 4,964,502.

TECHNICAL FIELD

The invention relates to impellers for use with material handling machines, such as silo unloaders, material blowers, crop cutting machines, lawn mowers, scattering unloaders, beat toppers, to pick up and convey particulate materials to a selected location. The impellers have rotating discs carrying pivoting paddles located within a housing for throwing particulate material out of the housing into a discharge chute. Impellers of this type are used in top unloading silo unloaders.

BACKGROUND OF INVENTION

Material throwing impellers having pivoting paddles are used in silo unloaders to pick up silage and haylage and throw these materials into a silage chute. An example of a impeller for a silo unloader having a pivoted paddles is shown by Hansen in U.S. Pat. No. 3,589,500. The paddles have generally V-shaped metal bodies pivotally connected to a rotor mounted on a drive shaft. The paddles are rotated within a housing having a bottom entrance opening and a top exit opening. The paddles move in close relationship to a sheet metal back wall leading upwardly to the exit opening. The paddles as they pick up the material impact material on the back wall and other inside surfaces of the housing. The material being wet has gum and strong adhessive characteristics which causes the material to collect on the back wall of the housing. The build up of a material on the back wall interfers with the rotational movement of the paddles and increases the power required for rotating the impeller. The build up of the gum-like material on the housing and paddles also decreases the throwing ability of the paddles. The material must be periodically removed from the interior of the housing which is a difficult and time consuming task. It is common practice to wash the inside of the impeller housing and impeller paddles with water to remove the material collected on the metal surfaces of the housing and impeller paddles. The machine must be shut down and manually serviced. A water hose must be hauled up into the silo so that the operator can flush out the machine to remove build up of material from the operating parts thereof. The impeller housing and paddles of the invention have substantially reduced material collection problems and eliminated the need to wash the machine to maintain efficient operation.

Silo unloader impeller housings are fabricated sheet metal structures having material inlet and outlet openings. An impeller having pivoted paddles is located within the housing. An example of a one-piece silo unloader impeller housing is disclosed by F. E. Buschbom in U.S. Pat. No. 3,221,904 issued Dec. 7, 1965. This housing cannot be taken apart to service and clean the interior thereof. Silo unloader impeller housings have been made in two sections to aid in assembly of the housings. These housings have a top section having horizontal members secured to a bottom section generally along the horizontal plane of the axis of rotation of the impeller. Major parts of the silo unloader must be removed to take the housing apart. This is a substantial project and is not normally done to clean out the impeller housing and impeller therein. The impeller apparatus of the invention has overcome these disadvantages of the prior silo unloader impeller housings.

SUMMARY OF INVENTION

The invention broadly relates to a material handling apparatus for moving bulk material including particulate material to a selected location. The material handling apparatus has a housing surrounding a chamber having an inlet opening and an outlet opening spaced from the inlet opening. The housing includes a wall section having an inside surface extended between the inlet and outlet openings. A low friction and abrasion resistant member is located in surface engagement with the wall section to minimize collection of the material on the inside surfaces of the housing. The low friction and abrasion resistant member is removably retained on the housing so that it can be replaced with a new low friction and abrasion resistant member. An impeller located within the chamber is operable to move material through the housing. The impeller has a plurality of paddle assemblies that have outer ends that move in close relationship to the abrasion resistant member. The housing includes walls having grooves for accommodating opposite edge portions of the abrasion resistant member to hold the member on the wall section of the housing. The housing has a door which can be opened to provide access to the abrasion resistant member to facilitate its removal from and insertion into the housing. The member is a one piece plastic liner of ultra high molecular weight and high density polymer. The material can be a polyethelene impregnated with abrasion resistant material, such as ceramics.

The impeller paddle assemblies include a liner of low friction and abrasion resistant plastic mounted on the leading sides of the paddle assemblies. The liners can be turned end-to-end or removed from the paddle assemblies and replaced with new liners.

A shaft rotatably mounted on bearings carries the impeller. The bearings are mounted on the housing for adjustment in a generally radial direction or direction normal to an arcuate surface of the liner mounted on the housing. A plurality of removable shims space the bearings from support members to allow the adjustment of the position of the impeller within the housing and the outer ends of the paddle assemblies relative to the liner. The radial distance or gap between the outer ends of the paddle assemblies and the liner is maintained at a minimum to insure efficient operation of the impeller.

The housing has a top cover that can be removed without disassembling the impeller or other parts of the machine. When the cover is removed the paddle assemblies can be serviced in a minimum time and effort. The cover has a forward lip and side walls that cooperate with holding flanges on the housing. Removable fasteners secure the cover to the housing.

DESCRIPTION OF DRAWING

FIG. 7 is a plan view of a liner apart from the impeller housing;

FIG. 8 is a side view of FIG. 7;

FIG. 9 is an end view of FIG. 7;

FIG. 10 is a sectional view taken along line 10—10 of FIG. 7;

FIG. 15 is an exploded perspective view of the paddle assembly.

DESCRIPTION OF PERFERRED EMBODIMENT

Figure 1:
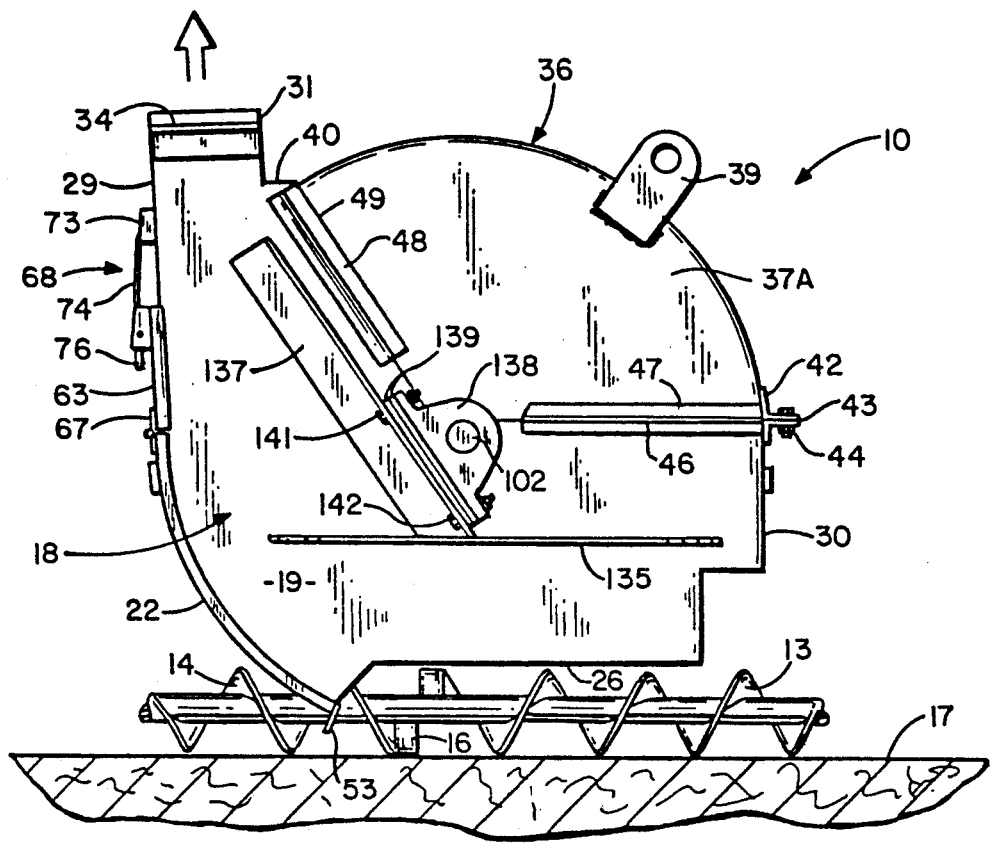
FIG. 1 is a fragmentary side elevational view of a silo unloader impeller assembly of the invention.
Figure 3:
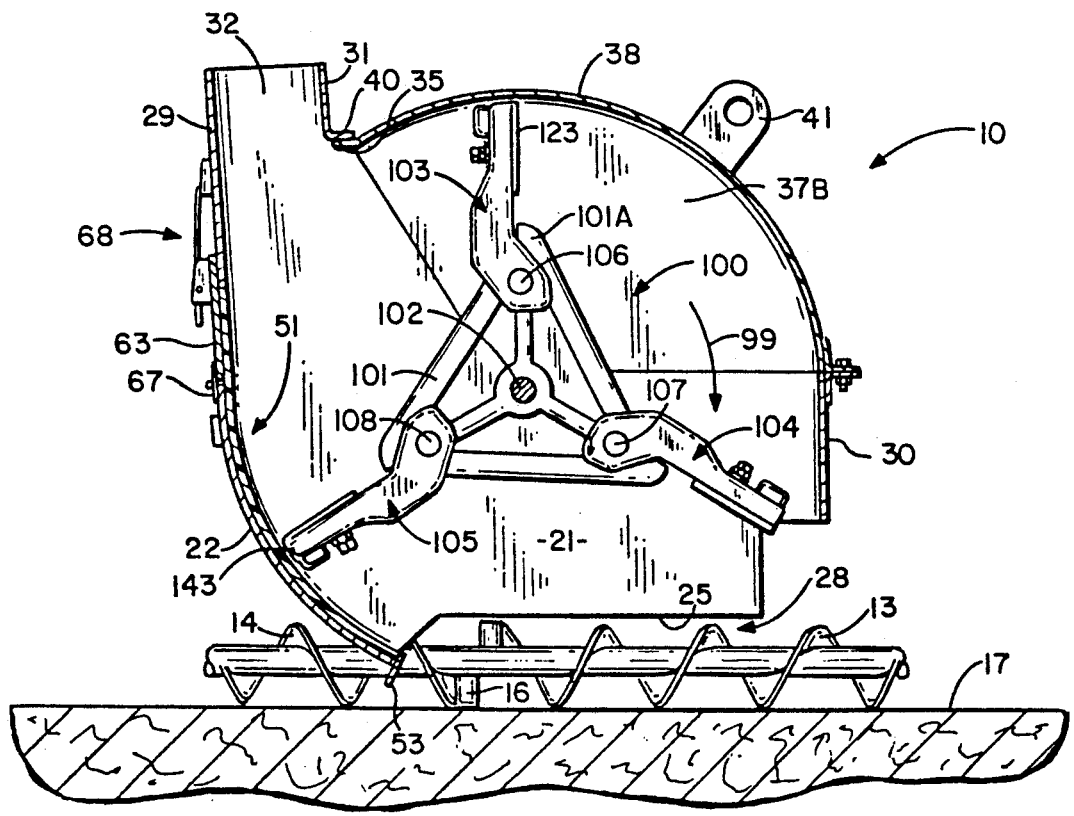
FIG. 3 is a sectional view taken along the line 3—3 of FIG. 2.
Figure 2:
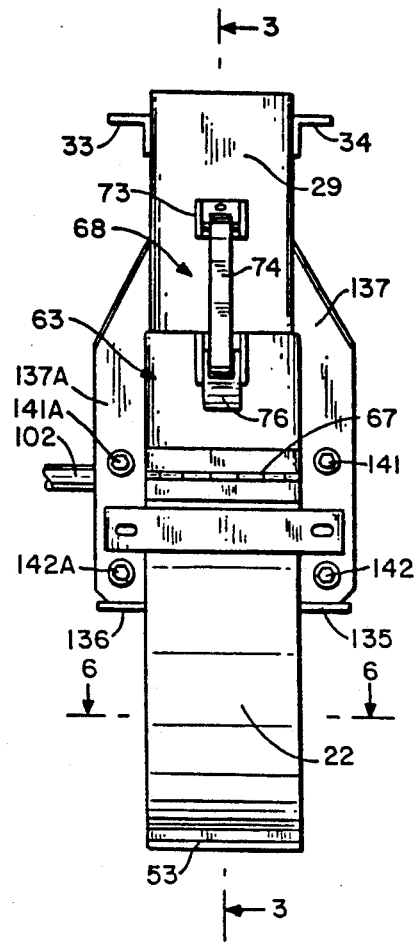
FIG. 2 is a rear elevational view of the impeller assembly of FIG. 1.

Referring to FIGS. 1 and 3, the impeller assembly of the invention indicated generally at 10 is mounted on a frame of a top unloading silo unloader. The silo unloader has material collectors or augers 13 operable to move material from the top surface 17 of the material in the silo toward impeller assembly 10. The leading auger has a short reverse flight 14 operable to move the material to radial flipper blades 16 that kick the material into the inlet opening of impeller assembly 10. Impeller assembly 10 as is herein described as incorporated into a top unloading silo unloader of the type disclosed by F. E. Buschbom in U.S. Pat. No. 3,232,456 issued Feb. 1, 1966. The invention incorporated in impeller assembly 10 is applicable to other agricultural, industrial, and residental equipment including but not limited to material and snow blowers, crop cutting machines, lawn mowers, scattering unloaders, beat toppers, pump and related equipment used to move liquids and particulate material to a selected location.

Impeller assembly 10 has a housing indicated generally at 18 comprising a parallel flat side walls 19 and 21 secured to a convex curved rear wall 22. Rear wall 22 has side flanges 23 and 24 that extend over outer edge portions of side walls 19 and 21 and are secured thereto by welds or the like. Side wall 19 has a bottom edge 25 aligned with a bottom edge 26 on side wall 21 forming a bottom or material inlet opening 28. Located above rear wall 22 is an upright back wall 29 secured to side walls 19 and 21. A lower front wall 30 is secured to front edge portions of side walls 19 and 21 above the front end of material inlet opening 28. A top front wall 31 facing back wall 29 secured to side walls 19 and 21 forms an upright neck having an outlet or top opening 32. The neck is inclined upwardly and outwardly at a slight angle from the vertical of about 3 degrees to locate the collector augers at a slight angle to automatically maintain an upward central cone shape of the top surface of the material in the silo. The neck can be maintained at other small angles to achieve the upward central cone shape of the top surface of the material in the silo.

The top front wall is spaced from the lower front wall providing a top opening into the inside chamber of housing 18. This opening permits admittance to impeller 100 within housing 18 without taking the machine apart. Repairs and adjustment of impeller 100 and paddle assemblies 103, 104 and 105 can be made with minimum time and effort.

A discharge chute (not shown) located above the neck directs the material from housing 18 toward a silo chute or other selected location. Angle members 33 and 34 secured to opposite sides of the neck are adapted to be attached to additional silo unloader structure such as a transition assembly providing an electrical connection to an electric motor (not shown) for driving the silo unloader.

The top opening of housing 18 is closed with a cover indicated generally at 36. Cover 36 can be removed from housing 18 to provide access to impeller 100 without disassembling the silo unloader. Cover 36 has parallel flat side walls 37A and 37B joined to a convex curved top wall 38. A pair of upwardly directed ears 39 and 41 having aligned holes at their outer ends are secured to side walls 37A and 37B and extend outwardly from top wall 38. Ears 39 and 41 are used to accommodate a pin so a cable hoist can be used to lift the entire silo unloader. The outer portion of top wall 38 has an angle member 42 that fits on top of a bracket 43 secured to lower front wall 30. A plurality of nut and bolt assemblies 44 releasably secure angle member 42 to bracket 43. The lower linear edges of side walls 37A and 37B are located adjacent side flanges 46 which form grooves 47 along walls 19 and 21 for the lower edges of side walls 37A and 37B. The lower edges of walls 37A and 37B of cover 36 lap over side walls 19 and 21 and fit into the grooves of flanges 46. Upwardly directed end flanges 48 extended from the center section of housing 18 toward upper front wall 31 have grooves 49 accommodating rear edges of walls 37A and 37B. The top of cover 36 has a rearwardly directed lip 35 that fits under a ledge or shoulder 40 secured to top front wall 31 whereby cover 36 is located on side walls 19 and 21 and engageable with front walls 30 and 31 to enclose the top of housing 18. Cover 36 can be removed from housing 18 by removing nut and bolt assemblies 44 and the nuts thereon and lifting cover 36 from side walls 19 and 21 and moving lip 35 from ledge 40.

Figure 4:
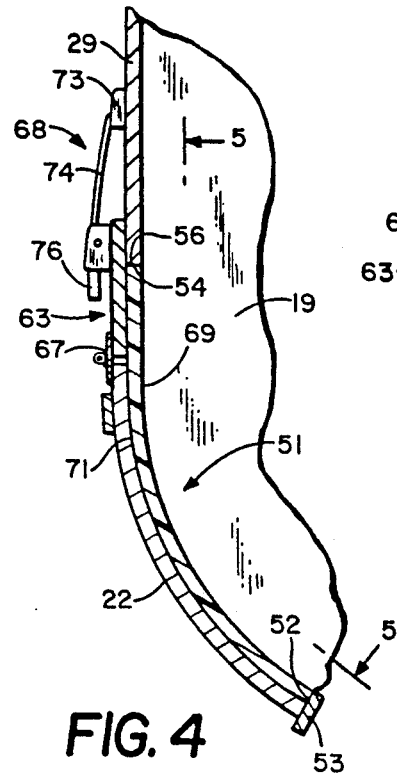
FIG. 4 is an enlarged vertical sectional view of the back of the impeller housing showing the removable liner.
Figure 5:
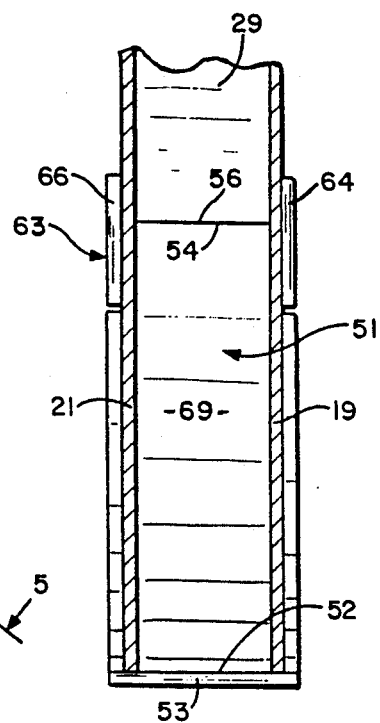
FIG. 5 is a sectional view taken along the line 5—5 of FIG. 4.

Referring to FIGS. 3, 4, and 5, an elongated arcuate liner, indicated generally at 51, of abrasion resistant plastic material having a low coefficient to friction is located in surface engagement with the inside surface of rear wall 22. Liner 51 is an elongated sheet member of bendable abrasion resistent plastic having a low coefficient of friction that promotes material flow and eliminates material build up in the housing. An example of a suitable abrasion resistant plastic material is an ultra high molecular weight and high density polymer. This material is highly abrasion and impact resistant which has minimum wear caused by sliding abrasion. The plastic is self lubricating with a very low coefficient of friction, and does not absorb moisture which reduces sticking and freezing of material on its surfaces. The plastic is resistant to moisture, acids, and chemicals, and will not rust or corrode. The wear resisting features of the plastic is enhanced with impregnated abrasion resisting material or particles 72, such as ceramics and like materials. An example of a suitable plastic is a polymer identified by the trademark TVIR-88 available from Poly Tech Industries, Inc. Monticello, Ga. 31064.

As shown in FIGS. 7 to 10, liner 51 is a one piece elongated, flat, rectangular sheet member having opposite transverse ends 52 and 54 and linear opposite parallel side edges 56 and 57. The sides surfaces 69 and 71 are smooth and continuous. The sheet member has uniform thickness and is bendable in the transverse direction to form a broad arcuate shape. An example of liner 51 for a silo unloader impeller housing is a one-piece plastic sheet member having a uniform thickness of ¼ inch, a width of 5⅛ inches, and a length of 20¼ inches. Liner 51 can have other sizes to fit into different shape and sizes of impeller housing. The plastic material is a low friction and ultra high molecular weight polyethyene impregnated with ceramic particles.

Liner 51 as shown in FIGS. 4 and 5, has lower transverse edge 52 bearing against a transverse plate or bar 53 secured to the lower end of rear wall 22 across the inner end of the bottom inlet opening 28 of housing 18. Liner 51 extends upwardly from bar 53 along the inside surface of back wall 22 to a transverse edge 56 at the bottom of back wall 29. The transverse upper edge 54 of liner 51 is located adjacent edge 56 thereby positioning liner 51 along the inside of back wall 22. The liner 51 is bent into an arcuate shape with the back surface 71 in continuous surface contact with the inside face of back wall 22. Liner 51 is held in this position to prevent material from collecting behind liner 51 and changing the location of front surface 69. Surface 69 extends from bottom end 52 along a circle above the horizontal plane of the axis of rotation of impeller 100. The radius of this circle extends from the axis of rotation of impeller 100. Bolts, rivets, and pins are not used to secure liner 51 to back wall 22 as these fasteners do not prevent material from working behind liner 51 and do not maintain a smooth continuous arcuate outer surface on liner 51.

Figure 6:
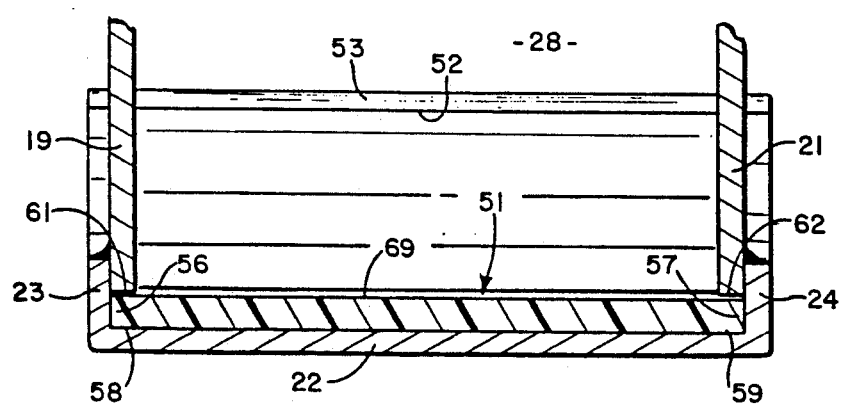
FIG. 6 is an enlarged sectional view taken along the line 6—6 of FIG. 2.
Figure 11:
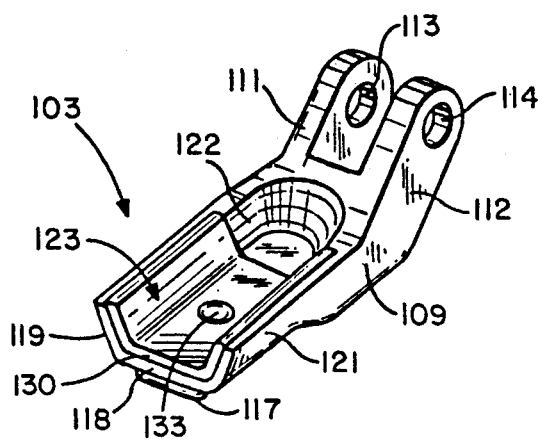
FIG. 11 is a perspective view of a paddle assembly of the impeller shown in FIG. 3.

As seen in FIG. 6, the opposite side edges 56 and 57 of liner 51 are located in grooves or tracks 58 and 59 between the outer edges 61 of side wall 19 and back wall 22 and the outer edge 62 of side wall 21 and back wall 22. Edges 56 and 57 have a sliding tight fit in grooves 58 and 59 so that liner 51 self seals on backwall 22 preventing material from getting behind liner 51. Grooves 58 and 59 are arcuate tracks open to transverse bar 53 and extend upwardly therefrom along the curvature of rear wall 22 to a movable door indicated generally at 63 for retaining the upper end of liner 51 in alignment with back wall 29. Door 63 is a generally flat plate having upright side flanges 64 and 66 that telescope over the side edges of side walls 19 and 21. A hinge 67 secures the bottom of door 63 to the top of rear wall 22 whereby door 63 can be moved from a closed position, as shown in FIG. 1, to an open position to provide access to the upper end of liner 51 to enable the removal of liner 51 from housing 18. The upper end of liner 51 is moved outwardly away from the lower edge 56 of back wall 22. An upwardly directed pulling force is applied to liner 51 with the use of a gripping tool to slide liner 51 along grooves 58 and 59. Alternatively, a tool can be inserted between liner 51 and back wall 22 to force or pop out liner 51 from grooves 58 and 59. A new liner can be placed along rear wall 22 by sliding the new liner along grooves 58 and 59 until lower end 52 thereof engages the cross bar 53. The upper end of the new liner is then placed in alignment with the lower edge 56 of back wall 29. Door 63 is moved upwardly to its closed position. A latch 68 holds door 63 in a closed position. Latch 68 can be released so that door 63 can be pivoted downwardly to an open position.

Latch 68 has a catch member 73 connected to back wall 29 above door 63. A hook 74 pivoted to an over center lever 76 is mounted on door 63. Hook 74 engages catch member 73 to hold door 63 shut. Lever 76 is moved up to release hook 74 from catch member 73 so that door 63 can be moved to an open position. Other types of latches and releasable fasteners can be used to hold door 63 shut.

As shown in FIG. 3, impeller indicated generally at 100 located within the housing chamber has a central generally triangular hub or disc 101 secured to a power driven shaft 102. The three corners of disc 101 are pivotally connected to paddle assemblies 103, 104 and 105. Separate pins 106, 107, and 108 pivotally connect paddle assemblies 103, 104, and 105 to the three corner portions of disc 101 for limited swinging movement relative to disc 101. Disc 101 has radial abutments 101A at each corner that limit forward pivotal movement of the paddle assemblies 103, 104, and 105 during rotation of impeller 100 in the direction of arrow 99. The centrifugal forces acting on paddle assemblies 103, 104, and 105 pivot the paddle assemblies about pins 106, 107, and 108 in forward directions until they contact abutments 101A. The longitudinal planes of the leading faces of paddle assemblies 103, 104, and 105 are in general radial alignment with the axis of rotation of impeller 100. These planes are rearwardly of the radial lines passing through pivot pins 106, 107, and 108. The center of gravity of each paddle assembly is forward of the center of rotation of the paddle assembly. This relationship between the center of gravity of the paddle assemblies and the center of rotation of the paddle assemblies holds the paddle assemblies substantially rigid in their radial positions even at relatively low rotational speeds. When relief of a paddle assembly is necessary, as when hard material enters the inlet opening of the housing, the paddle assembly will swing backward and ride over the hard material.

Paddle assemblies 103, 104, and 105 are identical in construction. The following description is limited to paddle assembly 103. As shown in FIGS. 11 to 15, paddle assembly 103 has a generally trough shape throwing body 109 joined to upwardly and inwardly directed arms 111 and 112. Holes 113 and 114 in arms 111 and 112 accommodate pivot pin 106 mounted on disc 101 to allow paddle assembly 103 to swing on disc 101. Arms 111 and 112 are laterally spaced from each other to accommodate a corner portion of disc 101. Body 109 and arms 111 and 112 are a one-piece cast metal, such as iron.

Body 109 has a longitudinal base 116 having a flat leading surface. A rear boss or rib 117 is on the trailing side of base 116 adjacent the outer end 118 thereof. Boss 117 is additional weight at the outer or tip end of paddle assembly 103. End 118 has a flat transverse surface that is parallel to the axis of rotation of paddle assembly 103 about pin 106. Side walls 119 and 121 joined to opposite sides of base 116 project forwardly and outwardly forming a generally U-shaped channel or recess 122 on the forward or leading side of body 109. Recess 122 has an inwardly stepped outer section as seen in FIG. 15 open to the outer end of base 116.

A shoe or liner, indicated generally 123, preferably of ultra-high molecular weight polymer impregnated with abrasion resistant particles such as ceramics, is located in the stepped section of recess 122 and secured to base 116 with bolt 133 accommodating nuts 134. Liner 123 is a one-piece abrasion resistant plastic having a low coefficient of friction that promotes material flow and eliminates material build up on liner 123 thereby reducing maintenance time and labor. The plastic is an ultra high molecular weight and high density polymer, that has highly abrasion and impact resistant characteristics that reduce wear caused by sliding abrasion. The plastic is self lubricating and has a low coefficient of friction, and does not absorb moisture which reduces sticking and freezing of material on its surfaces. The plastic is resistant to moisture, acids, and chemicals and will not rust or corrode. An example of a suitable plastic is a polymer identified by the trademark TIVAR-88 available from Poly Tech Industries, Inc. Monticello, Ga. 31064.

Figure 12:
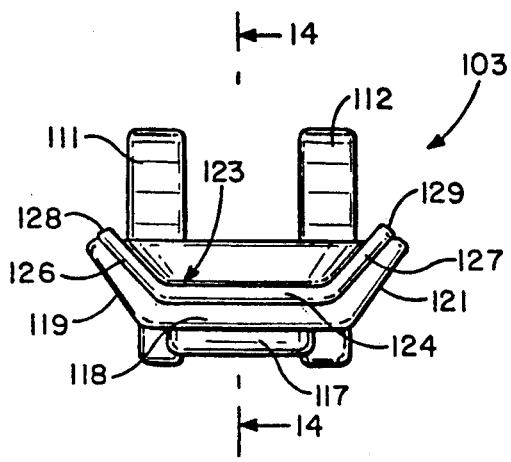
FIG. 12 is an enlarged outer end view of the paddle assembly of FIG. 11.
Figure 13:
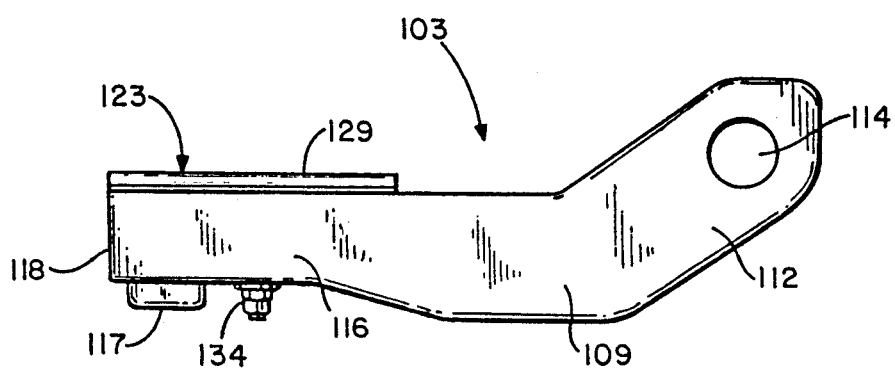
FIG. 13 is an enlarged side elevational view of the paddle assembly of FIG. 11.

Liner 123 has a generally flat bottom 124 located in surface engagement with the forward side of base 116. Upwardly and outwardly directed side flanges 126 and 127 are joined to bottom 124. Flanges 126 and 127, as seen in FIG. 12, have outer portions in tight surface engagement with the forward sides of side walls 119 and 121. Side flanges 126 and 127 have upper linear edges 128 and 129 that project above the top of the top edges of the side walls 119 and 121. Side flanges 126 and 127 being in tight contact with side walls 119 and 121 prevent material from working between liner 123 and body 109. Linear 123 has a flat outer transverse end 130 coextensive with the outer end 118 of body 109. The coextensive end surfaces 118 and 130 are spaced a very short radial distance inwardly from inner surface 69 of liner 51 during movement of paddle assembly 103 relative to liner 51. A minimum radial clearance between the arcuate section of inner liner surface 69 and the outer ends of paddle assembly is necessary for efficient impeller operation. If the gap or radial clearance is substantial material will collect and wedge at the outer ends of the paddle assemblies. This radial distance can be adjusted to change the tip clearance as hereinafter described.

Figure 14:
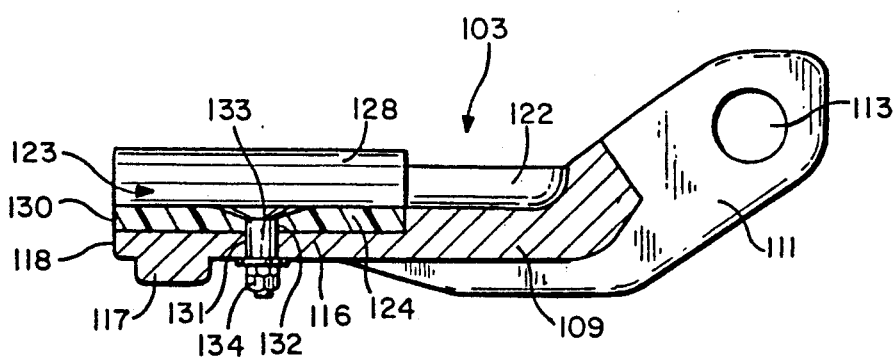
FIG. 14 is a sectional view taken along the line 14—14 of FIG. 12.

As seen in FIG. 14, bolt 133 extends through a hole 131 in body 109 and counter sunk hole 132 in liner 123. Bolt 133 is an elevator bolt having a large flat head engaging the center of the bottom 124 of linear 123. One of nuts 134 engages the outside surface of base 116 to retain the clamp force of bolt 133 on liner 123.

Liner 123 can be removed from body 109 by removing nuts 134 from bolt 133 and removing bolt 133 from body 109. A new liner can be placed into recess 122 and attached to body 109 by fastening bolt 133 to the new liner and body 109. Bolt 133 locates the inner transverse end 130A of liner 123 adjacent transverse shoulder 110 of body 109 thereby preventing liner 123 from turning on body 109. Liner 123 can be turned end-for-end so that end 130A is the outer end coextensive with end 118 of body 109. This increases the useful life of liner 123 as both ends 130 and 130A can be located at the outer end of body 109.

Returning to FIG. 1, a generally horizontal rib 135 is secured to the mid portion of side wall 19 to longitudinally strengthen side wall 19. A similar horizontal rib 136 is secured to side wall 21. An upwardly and rearwardly inclined angle member 137 is secured to side wall 19 above rib 135. Angle member 137 extends generally normal to a radial line of back wall 22 that extends from the middle of the curved section of back wall 22 to the axis of rotation of impeller 100. A similar second angle member 137A is secured to side wall 21. The angle members 137 and 137A are supports for bearings 138 that rotatably accommodating shaft 102. A plurality of generally flat shims 139 are located between bearings 138 and angle members 137 and 137A supporting the bearings. Bolts 141, 142, 141A and 142A secure bearings 138 to angle members 137, 137A and clamp shims 139 between bearings 138 and angle members 137 and 137A. The number of shims 139 can be selected to radially adjust gap 143, as shown in FIG. 3, between the outer or tip ends of the paddle assemblies 103, 104 and 105 and inner surface 69 of liner 51. The shims 139 have open end slots that accommodate bolts 141, 142, 141A and 142A so that a selected number of shims can be removed or added to provide for the radial adjustment of impeller 100 within housing 18. The adjustment can be achieved without removing shaft 102 from bearings 138. A minimum of tolerance or gap between liner 51 and the outer ends of the paddle assemblies 103, 104 and 105 as they rotate within the housing improves impeller efficiency and prevents build up and wrapping of material on the impeller assemblies.

While there has been shown and described a preferred embodiment of the impeller housing with a low friction and abrasion resistant liner and paddle assemblies with liners it is understood that changes in the structure, materials, arrangement of structure can be made by those skilled in the art without departing from the invention. The invention is defined in the following claims.

I claim:

1. A material handling apparatus comprising: a housing having a first side wall, a second side wall laterally spaced from the first side wall, and an end wall secured to said side walls, said housing having a chamber with a material inlet opening and a material outlet opening spaced from said inlet opening, impeller means located within said chamber of the housing operable to move material from the inlet opening and discharge the material through the outlet opening, and means rotatably mounting the impeller means on said housing whereby upon rotation of said impeller means material moves from the inlet opening toward the outlet opening and is discharged through said outlet opening, the impeller means includes paddle assemblies having outer ends that move adjacent said end wall, the means rotatably mounting the impeller means on said housing includes means for adjusting the position of the impeller means on said housing to adjust the clearance of the outer ends of the paddle assemblies relative to said end wall.

2. The apparatus of claim 1 wherein: the impeller means includes a shaft, the end wall has an arcuate section with a radius center generally at the axis of rotation of the impeller means, and members secured to said side walls extended normal to a radius of the mid-portion of said arcuate section, said means rotatably mounting the impeller means including bearings accommodating said shaft, said means for adjusting the position of the impeller means includes at least one shim between each bearing and member, and fasteners securing the bearings and shims to said members whereby the shims adjust the clearance of the outer ends of the paddle assemblies relative to said end wall.

3. The apparatus of claim 2 wherein: the shims have open end slots accommodating the fasteners whereby the adjustment of the impeller means can be achieved without removing the shaft from the bearings.

4. The apparatus of claim 1 wherein: the means for adjusting the position of the impeller means includes support members secured to the side walls and at least one shim between each support member and the means rotatably mounting the impeller means, and fasteners securing the means rotatably mounting the impeller means and shims to the support members whereby the shims adjust the clearance of the outer ends of the paddle assemblies relative to the end wall.

5. The apparatus of claim 1 wherein: the impeller means includes a shaft, and the means rotatably mounting the impeller means on the housing includes bearings accommodating the shaft.

6. The apparatus of claim 4 wherein: the end wall has an arcuate section with a radius center generally at the axis of rotation of the impeller means, the support members extended normal to a radius of the mid-portion of the arcuate section.

7. A material handling apparatus comprising: a housing having wall means surrounding a chamber having an inlet opening and an outlet opening spaced from the inlet opening, impeller means located within said chamber of the housing operable to move material from the inlet opening and discharge the material through the outlet opening, and means rotatably mounting the impeller means on said housing whereby upon rotation of said impeller means material moves from the inlet opening toward the outlet opening and is discharged through said outlet opening, the means rotatably mounting the impeller means on said housing includes means for adjusting the position of the impeller means relative to said wall means.

8. The apparatus of claim 7 wherein: the impeller means includes a shaft, the wall means has an arcuate section with a radius center generally at the axis of rotation of the impeller means, and members secured to said housing extended normal to a radius of the mid-portion of said arcuate section, said means rotatably mounting the impeller means including bearings accommodating said shaft, said means for adjusting the position of the impeller means includes at least one shim between each bearing and member, and fasteners securing the bearings and shims to said member whereby the shims adjust the position of the impeller means relative to said wall means.

9. The apparatus of claim 8 wherein: the impeller means includes paddle assemblies having outer ends that move adjacent the wall means, the shims adapted to adjust the clearance of the outer ends of the paddle assemblies relative to the wall means.

10. The apparatus of claim 8 wherein: the shims have open end slots accommodating the fasteners whereby the adjustment of the impeller means can be achieved without removing the shaft from the bearings.

11. The apparatus of claim 7 wherein: the means for adjusting the position of the impeller means includes support members secured to the housing and at least one shim between each support member and the means rotatably mounting the impeller means, and fasteners securing the means rotatably mounting the impeller means and shims to the support members whereby the shims adjust the position of the impeller means relative to the wall means.

12. The apparatus of claim 11 wherein: the wall means has an arcuate section with a radius center generally at the axis of rotation of the impeller means, the support members extended normal to a radius of the mid-portion of the arcuate section.

13. The apparatus of claim 12 wherein: each support member is a one-piece member having a generally L-shaped cross sectional shape.

14. A material handling apparatus comprising: a housing having laterally spaced side walls and an end wall secured to the side walls, a material inlet opening in a lower portion of said housing, a material outlet opening in an upper portion of said housing, impeller means located within said housing operable to move material from the inlet opening and discharge the material through the outlet opening, and means rotatably mounting the impeller means on said side walls whereby upon rotation of said impeller means material moves from the inlet opening through said housing and is discharged through said outlet opening, the impeller means includes a shaft, and the means rotatably mounting the impeller means on the side walls includes bearing means accommodating said shaft, and means adjustably mounting the bearing means on said side walls whereby the position of the impeller means can be adjusted relative to said end wall.

15. The apparatus of claim 14 including: support members secured to said side walls, said means adjustably mounting the bearing means on said side walls including at least one shim between each bearing means and each support member, and fastener means securing the bearing means and shims to said support members.

16. The apparatus of claim 15 wherein: the end wall has an arcuate section having a middle radius with a center generally at the axis of rotation of the impeller means, the support members extended generally normal to said radius whereby the position of the impeller means can be radially adjusted relative to the arcuate section.

17. The apparatus of claim 15 wherein: each shim is a generally flat member having ends with slots open to the ends, the slots accommodating the fastener means allowing the position of the impeller means to be adjusted without removing the shaft from the bearing means.

18. The apparatus of claim 17 wherein: the fastener means comprises nut and bolt assemblies extended through the bearing means and support members and the slots.

19. An adjusting apparatus for an impeller located within a housing of a material handling device, the housing having side walls and an end wall secured to the side walls, the impeller including a shaft, the shaft rotatably mounted on the side walls with bearings accommodating the shaft, comprising: support members secured to the side walls extended normal to a portion of the end wall, at least one shim between each bearing and support member, and fastener means securing the bearings and shims to the support members whereby the position of the impeller can be adjusted relative to the end wall.

20. The apparatus of claim 19 wherein: each shim is a generally flat member having ends with slots open to the ends, the slots accommodating the fastener means thereby allowing the position of the impeller to be adjusted without removing the shaft from the bearings.

21. The apparatus of claim 19 wherein: each support member is a one-piece member having a generally L-shaped cross sectional shape.

22. The apparatus of claim 20 wherein: the fastener means comprises nut and bolt assemblies extended through the bearings and support members and the slots.

* * * * *